Aug. 4, 1953

H. W. DIETERT 2,647,397

METHOD OF FORMING AND TESTING SPECIMENS OF MOLDING MATERIAL

Filed Aug. 13, 1951

INVENTOR.
HARRY W. DIETERT
BY
*Whittemore Hulbert & Belknap*
ATTORNEYS

Patented Aug. 4, 1953

2,647,397

UNITED STATES PATENT OFFICE 2,647,397

METHOD OF FORMING AND TESTING SPECIMENS OF MOLDING MATERIAL

Harry W. Dietert, Detroit, Mich., assignor to Harry W. Dietert Company, Detroit, Mich., a corporation of Michigan Application August 13, 1951, Serial No. 241,526

6 Claims. (Cl. 73—38)

The invention relates to a method of forming and testing specimens of compacted molding materials to determine the green strength, green deformation and green permeability of the same. It has heretofore been the practice to form a standardized test specimen such, for instance, as prescribed by the American Foundry Society, which is a compacted cylindrical body 2" in diameter and 2" in length with a tolerance plus or minus of $\frac{1}{32}$ of an inch. However, the amount of material required to produce a compacted specimen of such dimensions can not be accurately predetermined either by the weight or the bulk of the material in the loose or uncompacted state. This is for the reason that the materials to be tested vary as to:

1. Moisture content
2. Clay content
3. Clay quality
4. Grain size
5. Grain distribution
6. Additives such as:
   Cereal binders
   Wood
   Flour
   Sea coal
   Pitch Consequently, if the material is compacted in a cylindrical mold of a predetermined diameter the specimen produced may vary in length, and an exact length can only be obtained by a trial and error process as to the quantity of original material required.

It is the object of the invention to expedite the process by eliminating any trial and error steps. Thus instead of attempting to form a specimen of exact length, I use a sufficient quantity of uncompacted material to insure a minimum length of the compacted specimen and perform the tests under conditions in which any excess length over the minimum will not detrimentally affect the accuracy.

My improved method may be carried out in apparatus varying in construction and operation but I shall specifically describe and illustrate only one simple form.

Figure 1:
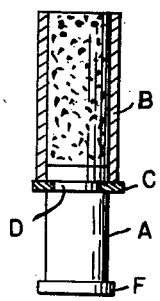
Fig. 1 is a sectional elevation of a cylindrical mold and supporting post or pedestal with the parts relatively positioned to receive and measure within the mold cavity the quantity of material for forming a compacted specimen of minimum length.
Figure 2:
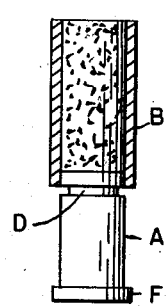
Fig. 2 is a similar view with the support for the mold on the post removed.
Figure 3:
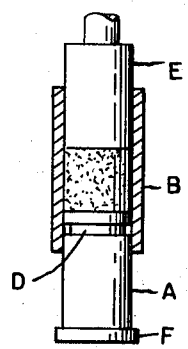
Fig. 3 is a similar view illustrating the ramming of the specimen within the mold against the top of the post.
Figure 4:
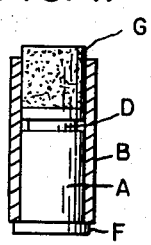
Fig. 4 is a similar view showing the mold stripped down upon the post.
Figure 5:
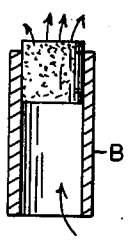
Fig. 5 illustrates the mold and specimen removed from the post for performance of the permeability test.
Figure 6:
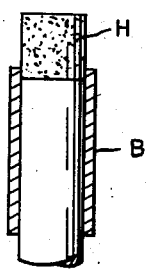
Fig. 6 shows the mold replaced on a post with a portion of the specimen of predetermined length projecting above the same.
Figure 7:
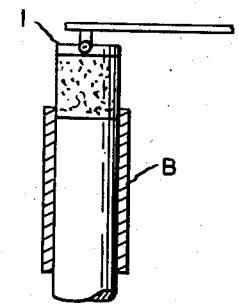
Fig. 7 is a similar view illustrating the application of tests to the projecting portion of the specimen.

As illustrated in Fig. 1, A is a post or pedestal on which is supported a cylindrical tubular mold B by means of a yoke C engaging a groove D in the post. In this position of the parts the quantity of material measured by the mold cavity is sufficient, regardless of variations in the composition thereof, to form a compacted specimen of at least a predetermined minimum length. In Fig. 2 the yoke is removed. In Fig. 3 a ram E is inserted in the upper end of the mold to compact the specimen against the top of the post. In Fig. 4 the mold is stripped down upon the post to engage a collar or shoulder F and in this position a portion of the mold projecting above the top of the post is of the minimum length of the specimen. Any excess in length of said specimen will project beyond the upper end of the mold as at G. In Fig. 5 the mold and specimen are removed from the post but remain in the same relative position to each other. The permeability test is then made by means (not shown) which forces air into the lower end of the mold and through the specimen. The excess length of this specimen will not alter the result as it is not surrounded by the wall of the mold and the air will freely diffuse in all directions therethrough. To prepare the specimen for further testing the mold is replaced on a post and is stripped down thereon until only the standard length H of the specimen projects upward free from the mold. This is illustrated in Fig. 6. While the parts remain in such relative positions a load is applied to the upper end of the specimen by a platen I as illustrated in Fig. 7, and this load is progressively increased until the specimen breaks, the maximum pressure being recorded. Also the shortening of the specimen before breaking is indicated by the distance the platen I is depressed. These two tests are unaffected by the excess length of the specimen as this is contained within the portion of the mold which is above the upper end of the post which holds it from any deformation.

The tests conducted by the method above described are within practical limits as accurate in specimens of varying length as they would be in a specimen of the prescribed length.

What I claim as my invention is:

1. A method of forming and testing specimens of compacted materials comprising measuring a volume of loose material which is in excess of that required to form in all variations thereof a compacted body of predetermined diameter which is of at least a predetermined minimum length, compacting said material in a mold of the said diameter, and testing the compacted specimen while a portion of the length thereof is retained within said mold and another portion of the length projects beyond the mold.

2. The method as in claim 1 in which a permeability test is performed on the specimen with only the said minimum length thereof retained within the mold, any excess over said minimum projecting beyond said mold.

3. The method as in claim 1 for performing load tests in which only the excess over the said minimum length of the specimen is retained in the mold.

4. The method of forming and testing specimens of compacted materials comprising forming a compacted specimen of predetermined diameter and of not less than a predetermined length, and testing the specimen while a portion of its length is retained within a surrounding wall and another portion of the length projects beyond said wall.

5. The method as in claim 4 in which a permeability test is performed on the specimen having only the said minimum length thereof retained within the surrounding wall.

6. The method as in claim 4 for performing load tests in which only the excess over the said minimum length of the specimen is retained within the surrounding wall.

HARRY W. DIETERT.

References Cited in the file of this patent

UNITED STATES PATENTS

| Number | Name | Date |
|---|---|---|
| 1,822,172 | Pfleumer et al. | Sept. 8, 1931 |
| 2,186,824 | Dietert | Jan. 9, 1940 |
| 2,371,508 | Dietert | Mar. 13, 1945 |
| 2,392,636 | Boehler | Jan. 8, 1946 |
| 2,392,637 | Boehler | Jan. 8, 1946 |